Feb. 3, 1942.   J. ROBINSON   2,271,661
AUTOMATIC TRAIN PIPE CONNECTOR
Filed Dec. 10, 1938   2 Sheets-Sheet 1

INVENTOR
JOSEPH ROBINSON
BY Robb & Robb
ATTORNEY

Feb. 3, 1942.  J. ROBINSON  2,271,661
AUTOMATIC TRAIN PIPE CONNECTOR
Filed Dec. 10, 1938   2 Sheets-Sheet 2
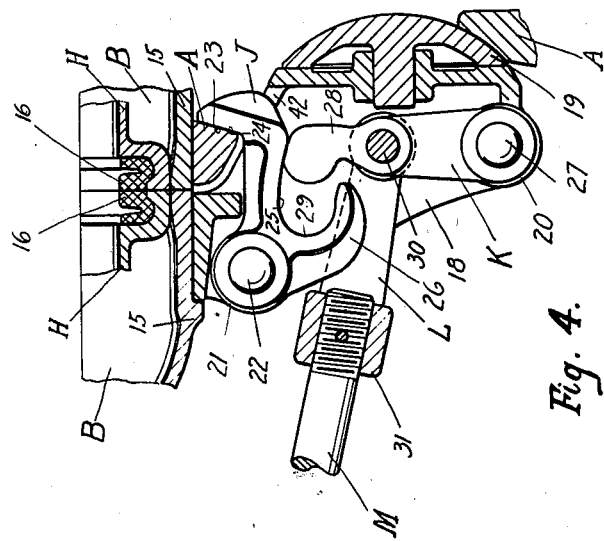
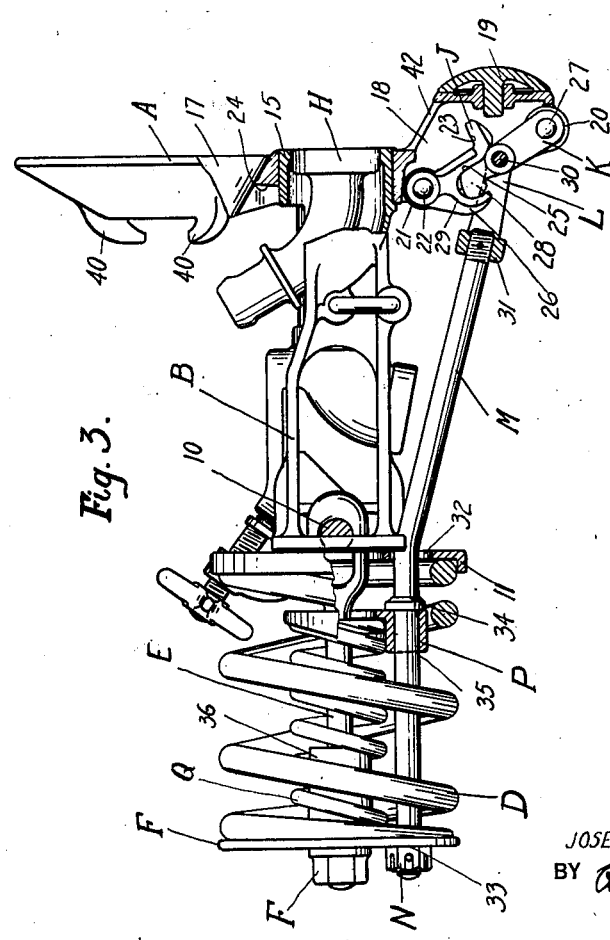
INVENTOR
JOSEPH ROBINSON
BY *Robb & Robb*
ATTORNEY Patented Feb. 3, 1942

2,271,661

UNITED STATES PATENT OFFICE 2,271,661

AUTOMATIC TRAIN PIPE CONNECTOR

Joseph Robinson, New York, N. Y., assignor of one-half to Roy M. Wolvin

Application December 10, 1938, Serial No. 244,932

4 Claims. (Cl. 285—58)

This invention relates to automatic train pipe connectors and is an improvement on the construction covered by my United States Letters Patent #2,141,196, granted December 27, 1938. Among the objects is to provide an improved fully automatic lock for positively locking mated connector heads together distinguished by the provision of a lock for the lock whereby the lock is prevented from creeping open. The arrangement is such that the lock automatically takes up any wear on the locking parts, and exerts a continuous and powerful longitudinal pull or clamping action on the mated heads.

In the drawings, in which like reference characters indicate similar parts,

Figure 3 is a sectional plan view of my improvement, and

Figure 4 is a horizontal section through the ball member 18 showing my improved lock in the locked position. In this view a part of an adjacent connector head is shown.

Figure 2:
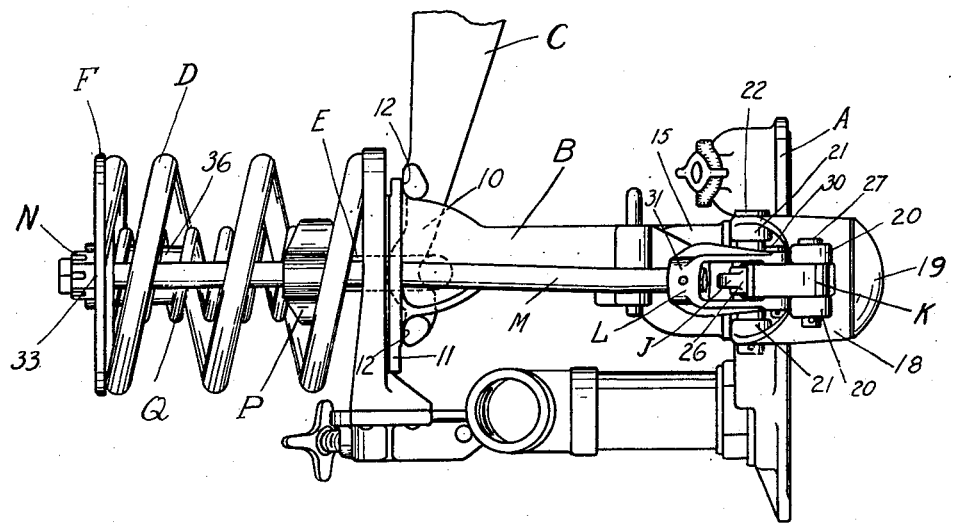
Figure 2 is a side view of Figure 1 with a part of the bracket C broken away.

The coupling head A is suitably mounted on a yoke B which spans and is yieldingly supported on the bracket C, for universal movement thereon, by the buffer spring D and tie rod E. The rod is hooked around the lug 10 of the bracket, Figures 2 and 3, for pivotal movement thereon and ties the spring D to the bracket under pressure through the medium of the adjustable stop or seat F, the head A being yieldingly held at the limit of its forward movement by said spring with the flange 11 of the yoke pressed against the flat rear side 12 of the bracket. The bracket suitably attaches the connector to the usual lug G of the car coupler, not shown, with the front face of the uncoupled head positioned in advance of the pulling face of the coupler two or three inches. The hollow forward end 15 of the yoke is pressed into an opening in the head to receive it, or is otherwise secured to the head, and removably carries a fitting H having a gasket 16 grooved as shown to admit liquid thereto to expand the gasket against a mating gasket, Figure 4. The gathering means of the head A comprises a rearwardly extending shallow funnel 17 and a forwardly extending short stubby horn or ball member 18 having a removable part-spherical face 19. The ball member is hollow and is provided with spaced vertically arranged bearings 20—21 one of which lies in advance of the front or coupling face of the head A and the other of which lies behind such face. In the bearing 21 I pivotally mount, as by a pin 22, a suitable lock or dog J having an outwardly inclined face 23 adapted to mate with a similar face or seat 24 formed in the head A adjacent the inner edge of the funnel and preferably on the horizontal center line of the funnel. The lock is provided with a bearing 25 on its rear side which merges into an overhanging forwardly extending laterally spaced release lug or finger 26. An anti-creep device K, which is also an actuating lever, is pivotally mounted in the bearing 20 by the pin 27 and is provided with a head 28 shaped to mate with and travel along the bearing or way 25. Normally the head 28 rests in the throat 29, Figures 3 and 4, formed by the outward spacing of the finger or lug 26 with respect to the body of the dog J, and preferably fits quite snugly therein. A U shaped spanner L straddles the finger 26 and the lever K and is pivotally connected to the latter by the pin 30. The base of the spanner threadingly receives, as at 31, the forward end of a plunger rod M which extends along the outside of the yoke B, through an opening 32 in the flange 11, through the buffer spring D, and through a suitable bearing formed at 33 in the stop or seat F to slidingly receive it. A timing nut or stop N is threaded to the rear end of the plunger M to adjust and time the throw of the lock J and to engage the rear side of the seat F to automatically draw the lock open, that is to say away from the seat 24 on the head A, when mated connectors uncouple. A bracket P is mounted on the rod M, inside the buffer spring D, and abuts a stop 34 on the rod, the bracket being provided with an opening 35 through which the tie rod E extends. A suitable actuating or lock spring Q surrounds the tie rod with its rear end resting on a seat 36 formed on the plate F to receive it and with its forward end bearing against and resting on the plunger rod bracket P.

Figure 1:
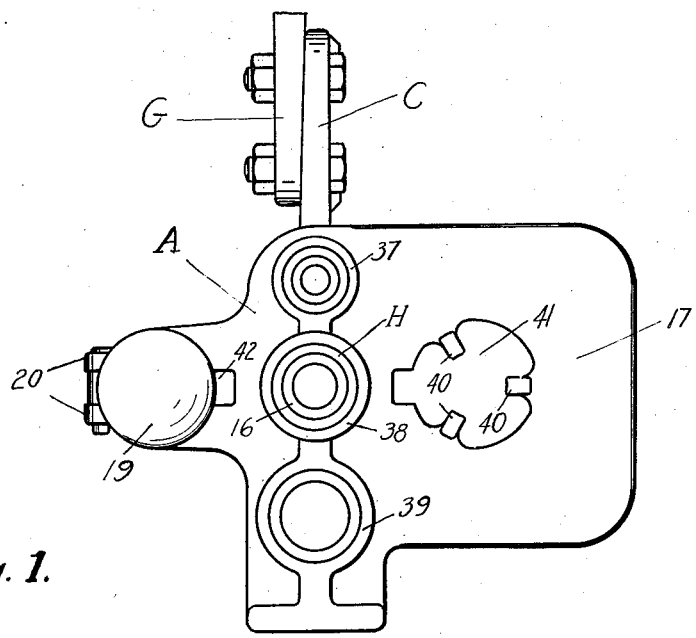
Figure 1 is a front elevation of an automatic connector provided with my improved lock.

When a pair of connectors having my improved lock are coupled, the ports 37, 38 and 39, Figure 1, are brought into accurate alignment by the funnel 17 and ball member 18, the face 19 of the ball coming to final rest in the curved seats on the front face of a plurality of spaced bearing lugs 40. These lugs are formed integral with the funnel on its rear side and project into the large opening 41 of the funnel, Figures 1, 3 and 4. Preferably they are so spaced that the lock seat 24 is between the two lugs that are nearest the vertical center of the head A. When the connectors are thus aligned, further coupling movement compresses the buffer springs D carrying the flange 11 away from the rear side of the bracket C. Inasmuch as the tie rod E is anchored to the bracket, and the plate F is anchored to the tie rod, the lock spring Q does not move rearwardly nor is it immediately compressed. Instead the anti-creep device or lever K rocks forward on its pin 27 throwing the lock J through the opening 42 in the inner wall of the ball member 18, Figures 1, 3 and 4, into engagement with its seat 24. This brings the lock and lever to approximately the position shown in Figure 4. Further coupling movement of the connectors compresses the lock spring Q thus placing the lock J under a strong cam or wedging action through the medium of the lever K as the lever travels along the bearing or cam way 25 formed on the back of the lock to receive it. In this manner the lock is forced powerfully into the locked position, Figure 4, with adequate automatic take-up remaining in the lock to meet any condition of wear that may develop on the parts. The cam or wedging action of the lock on the inclined lock seat 24 draws the coupling heads A longitudinally towards each other into firm interlocked position with gaskets in the ports 37, 38 and 39 compressed. Preferably these gaskets are of the bellows or self expanding type shown in Figure 4 of the accompanying drawings and at 42 in Figures 2 and 5 of my aforesaid copending application. The reverse of the above described coupling act opens the lock J and releases the head A. It will be apparent that the anti-creep device or lever K positively prevents the lock J from creeping open, and that it is not possible for any of the locking effect to be diminished by the pressure in the ports 37, 38 and 39. The construction produces what may be termed a lock to the lock arrangement, which is the main difference between the present invention and the subject matter of my aforesaid copending application. In other respects the construction and operation of the lock, and its co-operating parts, herein described, are generally the same as the similar parts in that application.

What I claim is:

1. An automatic train pipe connector comprising, in combination, a coupling head, a support therefor, a lock for locking said head to a companion head with an automatic take-up clamping action, and automatic means for operating said lock and for effectuating said automatic take-up, said means including a plunger and a lock-to-the-lock device actuated by said plunger and which positively prevents said lock creeping from the closed position towards the open position and which automatically moves the lock inwardly from the normal closed position to take up wear on the parts as wear occurs.

2. An automatic train pipe connector comprising, in combination, a coupling head, a support therefor, a lock for locking said head to a companion head with a clamping action that constantly draws the mating heads longitudinally towards each other, and automatic means for operating said lock, said means including a plunger, a spring, and a cam device engaging the rear side of said lock and actuated by said spring and said plunger and which, under the influence of said spring automatically takes up wear on the locking parts and on the joint between said heads, said device serving also to positively prevent said lock creeping from the closed position towards the open position.

3. An automatic train pipe connector comprising, in combination, a coupling head having suitable guides one of which is provided with an opening and another of which is provided with a seat to receive a lock, a bracket, a yoke connected with said coupling head and extending to the rear of said bracket, a buffer spring acting against said yoke to project and yieldingly support said head, a lock for said head, and automatic means for moving said lock through the opening in said guide into said seat on a counterpart head to lock said heads together with an automatic take-up clamping action, said means including a spring actuated plunger extending from said coupling head into said buffer spring, and a lock-to-the-lock device operated by said plunger and which engages the rear side of said lock to automatically take up wear on the locking parts and on the joint between said heads, said device serving also to positively prevent said lock creeping from the closed position towards the open position.

4. An automatic train pipe connector comprising, in combination, a coupling head having ball and funnel guides comprising a rearwardly extending funnel member and a forwardly extending ball member, a vertical bearing adjacent the base of said ball member, a bracket, a tie rod pivotally mounted on said bracket, a yoke connected with said head and extending to the rear of the bracket, a buffer spring secured to said bracket and said yoke by said tie rod and acting to hold the yoke normally against the rear face of the bracket to project and yieldingly support said head, a plunger extending from said head into said buffer spring, a spring positioned within the buffer spring and carried by said tie rod and acting on said plunger, a lock mounted on said bearing and adapted to be rocked through an opening in said ball member into locked position by said plunger when said buffer spring is compressed in coupling, a lock-to-the-locked device co-operating with said plunger to rock said lock into and out of the locked position and to prevent outward creeping of the lock from such position, said lock being provided on its rear side with a seat occupied by the front end of said device when the connector is uncoupled and with a way along which said end of said device travels after leaving said seat as mating connectors couple, and means for timing the operation of said lock and said device with respect to the coupling and uncoupling movement of said connectors.

JOSEPH ROBINSON.